United States Patent
Mangiardi et al.

(10) Patent No.: US 9,020,533 B1
(45) Date of Patent: Apr. 28, 2015

(54) LOCATION SERVICES

(75) Inventors: Dominick Mangiardi, Fremont, CA (US); Abdolreza Asghari, Santa Clara, CA (US); Mark J. Bonn, Granite Bay, CA (US); ShouJei Cheng, Fremont, CA (US); James D. Kirby, San Mateo, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 2069 days.

(21) Appl. No.: 12/029,614

(22) Filed: Feb. 12, 2008

(51) Int. Cl.
*H04W 24/00* (2009.01)
*H04W 64/00* (2009.01)

(52) U.S. Cl.
CPC .................................. *H04W 64/003* (2013.01)

(58) Field of Classification Search
USPC .............................. 455/456.1–456.6; 370/310
See application file for complete search history.

(56) References Cited

U.S. PATENT DOCUMENTS

| | | | |
|---|---|---|---|
| 6,522,882 B1 * | 2/2003 | Chen et al. | 455/439 |
| 6,816,735 B1 | 11/2004 | Rayburn et al. | |
| 7,194,278 B1 | 3/2007 | Cook | |
| 7,197,322 B1 | 3/2007 | Rayburn et al. | |
| 7,209,758 B1 | 4/2007 | Moll et al. | |
| 2004/0156326 A1 * | 8/2004 | Chithambaram | 370/310 |
| 2007/0275732 A1 | 11/2007 | Jethwa et al. | |

OTHER PUBLICATIONS

800 ADEPT; "SmartGEO;" May 29, 2007; 1 page; www.800adept.com/Mservices/mGeo.asp.
U.S. Appl. No. 11/741,417, filed Apr. 27, 2007.

* cited by examiner

*Primary Examiner* — Charles Shedrick (57) ABSTRACT

In various embodiments, methods, systems, and software are provided to provide location services to a mobile device. In an embodiment, a method comprises receiving a call request (including a caller identification) for a call from a mobile device, and determining if the call qualifies for a status update based on the caller identification. In response to determining that the call qualifies for a status update, the method also comprises receiving a location of the mobile device, determining the identity of a mobile unit that is in progress to the location of the mobile device, and initiating a location request of the mobile unit, receiving a location of the mobile unit in response to the location request, and providing status information based on the location of the mobile unit and the location of the mobile device to a user of the mobile device.

24 Claims, 9 Drawing Sheets

LOCATION SERVICES

OVERVIEW

Mobility is a key feature of many wireless communication systems. In fact, many applications benefit from the availability of location information related to the current position of a mobile wireless device. For example, when traveling in an automobile, location information may be very valuable to the driver for navigation purposes. Companies such as delivery services use location information to keep track of their drivers. Other users may use location information in any of a wide variety of applications related to their mobile wireless devices.

This location information may be generated using a variety of methods. For example, the location of the base transceiver station (BTS) antenna that is currently being used provides an approximate location of the wireless device since it must be within range of the antenna. Also, the sector within a wireless network currently serving the mobile device provides an approximate location of the device. Other mobile devices may include Global Positioning System (GPS) capability, providing a more precise location of the device.

TECHNICAL SUMMARY

In various embodiments, methods, systems, and software are provided to provide location services to a mobile device. In an embodiment, a method comprises receiving a call request (including a caller identification) for a call from a mobile device and determining if the call qualifies for a status update based on the caller identification. In response to determining that the call qualifies for a status update, the method also comprises receiving a location of the mobile device, determining the identity of a mobile unit that is in progress to the location of the mobile device, and initiating a location request of the mobile unit, receiving a location of the mobile unit in response to the location request, and providing status information based on the location of the mobile unit and the location of the mobile device to a user of the mobile device.

In another embodiment, a communication system comprises a communication network, a server, and a location determination system. The server is configured to receive a call request (including a caller identification) for a call from a mobile device, and determine if the call qualifies for a status update based on the caller identification. In response to determining that the call qualifies for a status update, the server is also configured to receive a location of the mobile device, determine the identity of a mobile unit that is in progress to the location of the mobile device, and initiate a location request of the mobile unit, receive a location of the mobile unit in response to the location request, and provide status information based on the location of the mobile unit and the location of the mobile device to a user of the mobile device.

In a further embodiment, a computer-readable medium containing software for operating a communication system for providing location services is provided. When the software is executed by the communication system, the communication system is directed to receive a call request (including a caller identification) for a call from a mobile device, and determine if the call qualifies for a status update based on the caller identification. In response to determining that the call qualifies for a status update, the communication system is also directed to receive a location of the mobile device, determine the identity of a mobile unit that is in progress to the location of the mobile device, and initiate a location request of the mobile unit, receive a location of the mobile unit in response to the location request, and provide status information based on the location of the mobile unit and the location of the mobile device to a user of the mobile device.

DETAILED DESCRIPTION

Figure 1:
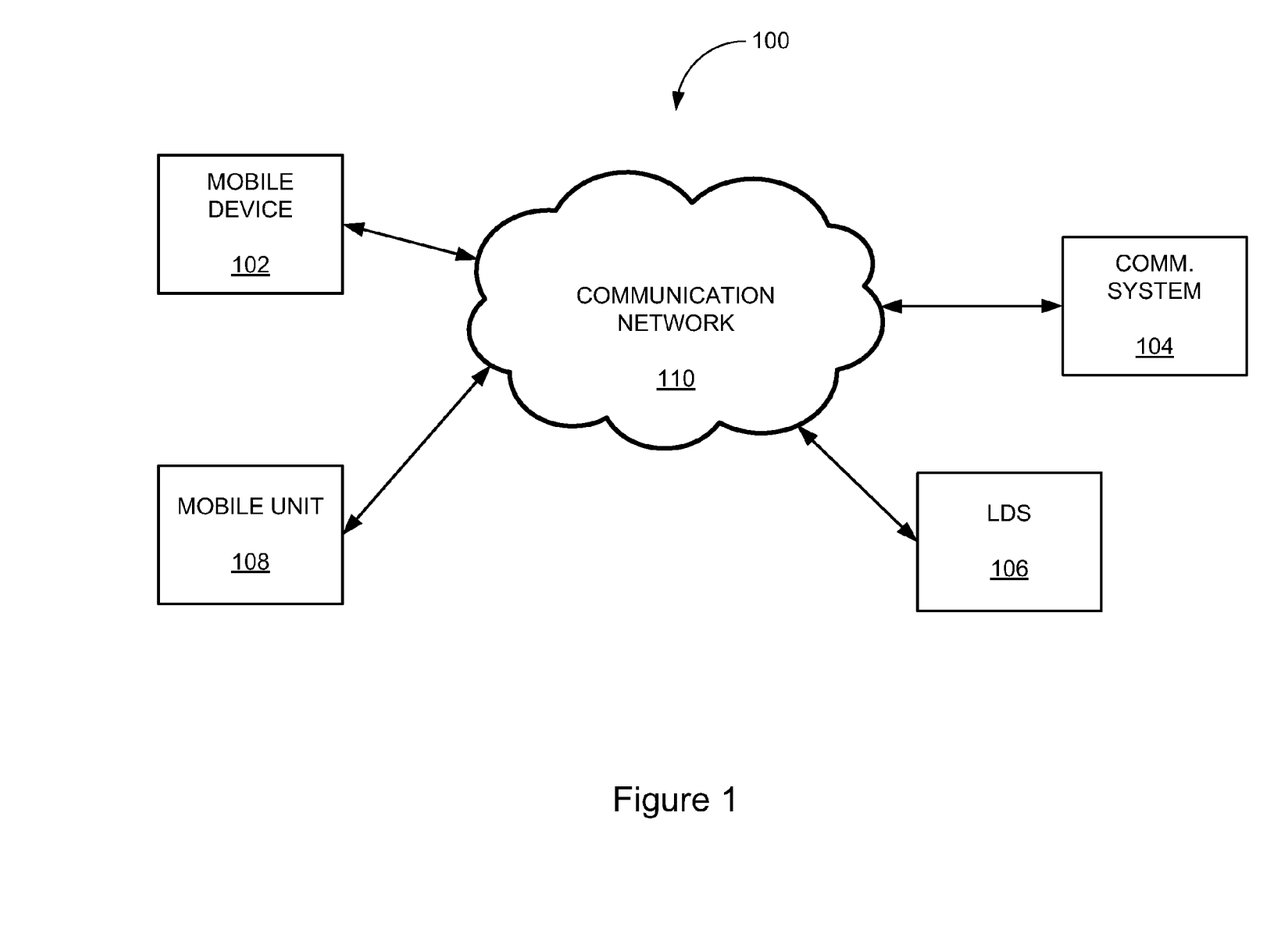
FIG. 1 is a block diagram illustrating a communication system for providing location services.

FIG. 1 is a block diagram illustrating a communication system 100 for providing location services. This embodiment includes mobile device 102, mobile unit 108, communication system 104, and location determination system (LDS) 106, all coupled together through communication network 110. Mobile device 102 may be any wireless, mobile device capable of making and receiving calls, and configured such that its location may be determined by LDS 106. Mobile unit 108 is any mobile device configured such that its location may be determined by LDS 106. Optionally, mobile unit 108 is capable of making and receiving calls, but this functionality is not necessary. Communication system 104 is any system capable of receiving call requests from mobile device 102, sending location requests to LDS 106, and receiving location information from LDS 106. In some embodiments, communication system 104 may include the capability of processing location information into a status update. Communication system 104 is further illustrated in FIG. 9, and described below.

When two mobile devices interact, location information may be valuable, and also difficult to obtain. For example, if two friends, each having a mobile device, wish to meet, the location of each device, along with the distance between the devices may be of use. Also, if a mobile unit, such as a taxi, has been sent or dispatched to the location of a user of a mobile device, the current location of the taxi, the distance from the taxi to the user, or the estimated time of arrival of the taxi may be of interest to the user.

Figure 2:
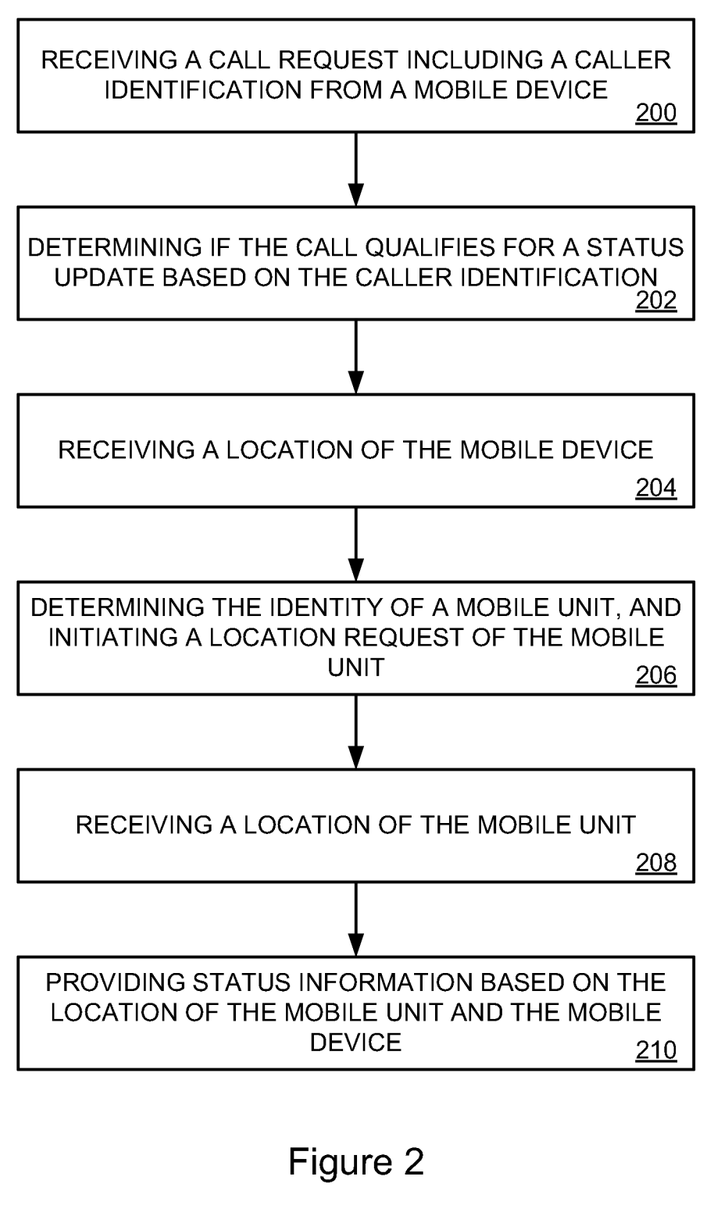
FIG. 2 is a flow diagram illustrating a method for providing location services.

FIG. 2 is a flow diagram illustrating a method for providing location services. Reference numbers for FIG. 2 are indicated parenthetically below. In this method for providing location services, communication system 104 receives a call request including a caller identification from mobile device 102, (operation 200). Communication system 104 then determines if the call qualifies for a status update based on the caller identification, (operation 202). Various embodiments may use a variety of different methods to determine if the call qualifies for a status update. Some example methods are illustrated in FIGS. 3 through 8, and described below.

If the call qualifies for a status update, communication system 104 then receives a location of mobile device 102, (operation 204). Communication system 104 determines the identity of a mobile unit 108, and initiates a location request of mobile unit 108, (operation 206). The identity of mobile unit 108 may be determined in a variety of methods, including a table of mobile units correlated to mobile devices. For example, there may be a one-to-one correlation of mobile units and mobile devices in some embodiments, and a table correlating the two categories could be created well in advance. Other embodiments may include dispatching a mobile unit 108 to the mobile device 102 in an earlier call, and the table is simply a record of this dispatch.

The location request may be sent to a location determination system 106, which then determines the location of mobile unit 108 using any of a variety of methods. Location determination system 106 then transmits a location of mobile unit 108 to the communication system 104, (operation 208).

Once communication system 104 has received the locations of mobile device 102 and mobile unit 108, it provides status information to mobile device 102, (operation 210). This status information make take any of a variety of forms, such as, the location of mobile unit 108, the distance between mobile unit 108 and mobile device 102, or the estimated time of arrival of mobile unit 108 at the location of mobile device 102.

Figure 3:
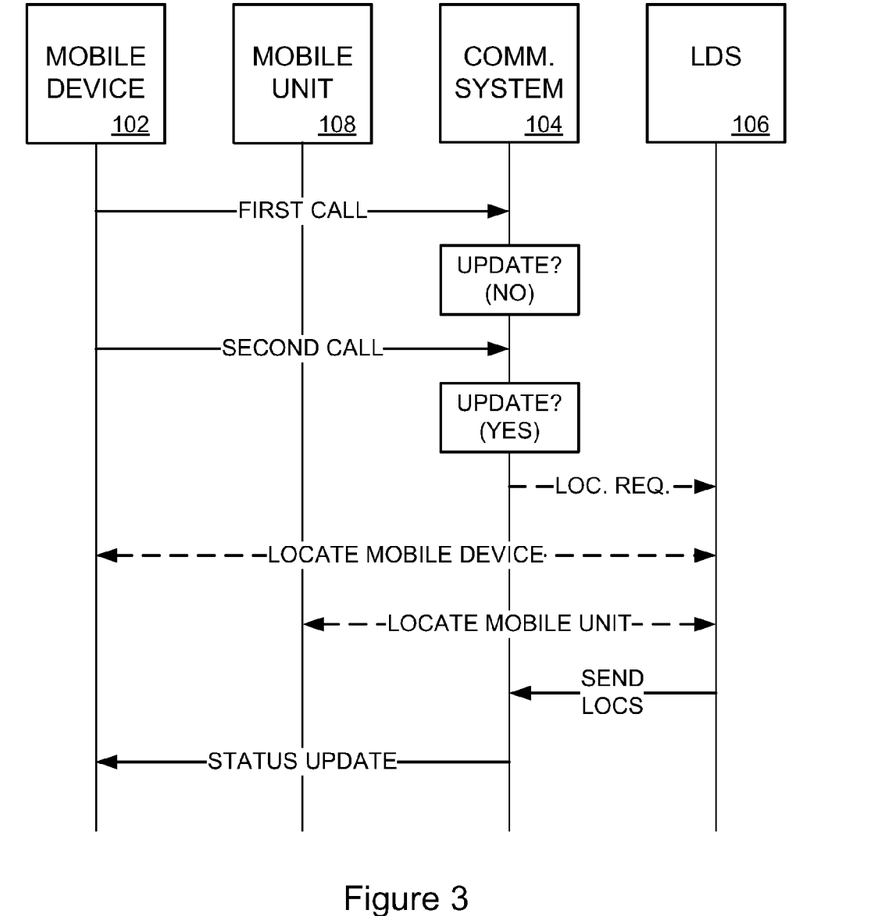
FIG. 3 is a call flow diagram illustrating a method for providing location services.

FIG. 3 is a call flow diagram illustrating a method for providing location services. This call flow diagram further illustrates the communication system 100 of FIG. 1 and the method of FIG. 2. Mobile device 102 places a first call to communication system 104. This first call may take any of a variety of forms. In some examples, this first call triggers the movement of mobile unit 108 to the location of mobile device 102. For example, the user of mobile device 102 may have just called for a cab, ordered a pizza, called a plumber, invited a friend over, or performed any of a wide variety of other types of communication.

Before and during the first call, communication system 104 is configured such that mobile device 102 does not qualify for a status update. Once mobile device 102 places a second call to communication system 104, upon receipt of the call request from mobile device 102, system 104 is configured such that mobile device 102 qualifies for a status update once a second call request is received. Other examples may use additional or different requirements for a mobile device to qualify for a status update. For example, some systems may check to see if mobile unit 108 is in route to the location of mobile device 102 before allowing any status updates, regardless of the quantity of calls from mobile device 102.

When a second call request is received and communication system 104 determines that mobile device 102 is qualified for a status update, communication system 104 sends a location request to LDS 106. LDS 106 then determines a location of mobile unit 108 using any of a variety of methods. Optionally, LDS 106 also determines a location of mobile device 102. In some embodiments, the location of device 102 may already be known, so no new location information is required. Once LDS 106 determines the necessary locations, it sends these locations to communication system 104. At this point, system 104 may either provide the location information directly to mobile device 102, or may process the location information to provide information such as distance or estimated time of arrival.

Figure 4:
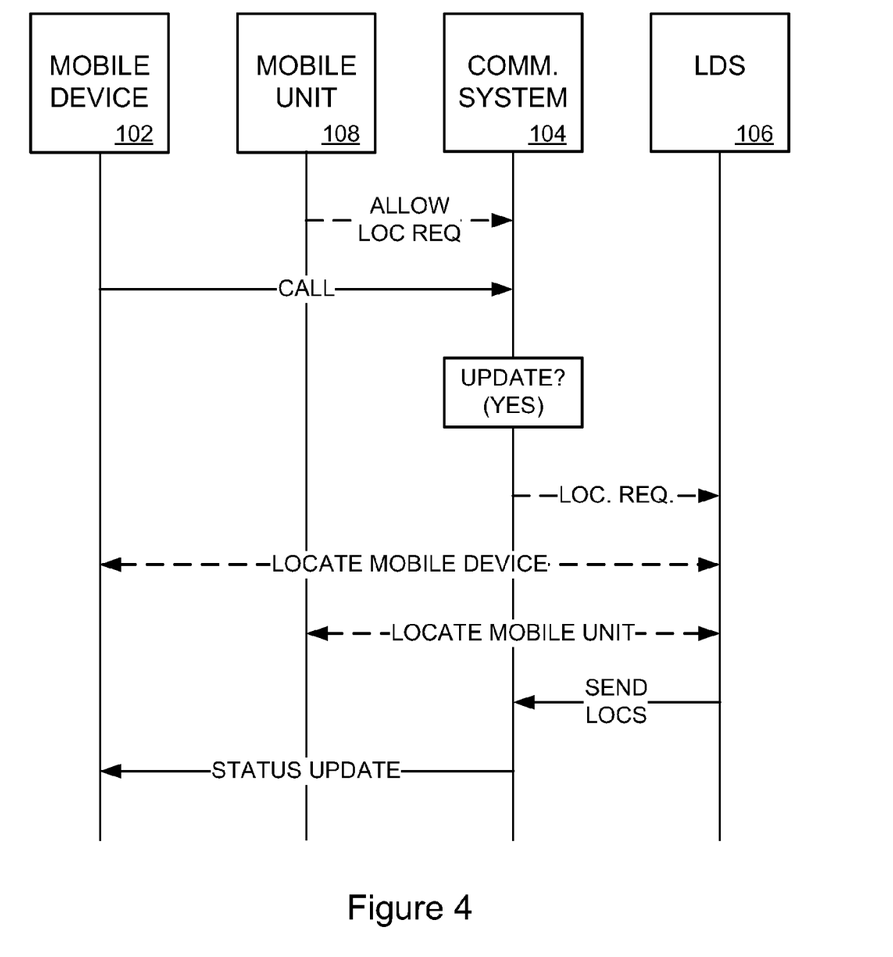
FIG. 4 is a call flow diagram illustrating a method for providing location services.

FIG. 4 is a call flow diagram illustrating a method for providing location services. In this example, mobile unit 108 signals communication system 104 to allow location requests. This signaling may take place using any of a variety of methods. For example, the user of mobile unit 108 may send a code to system 104 along with the phone number of mobile device 102 signaling system 104 that any status updates from mobile device 102 are to be allowed. The code may be a sequence of key presses during a call to system 104, a text message to system 104, or any other data communication to system 104.

Communication system 104 receives a signal from mobile unit 108 allowing location requests. When it then receives a call from mobile device 102, it determines that mobile device 102 qualifies for a status update. Once mobile device 102 qualifies for a status update, communication system 104 performs a location request to LDS 106, and in response receives location information from LDS 106. Communication system 104 then sends a status update to mobile device 102, similar to the method illustrated in FIG. 3 and described above.

Figure 5:
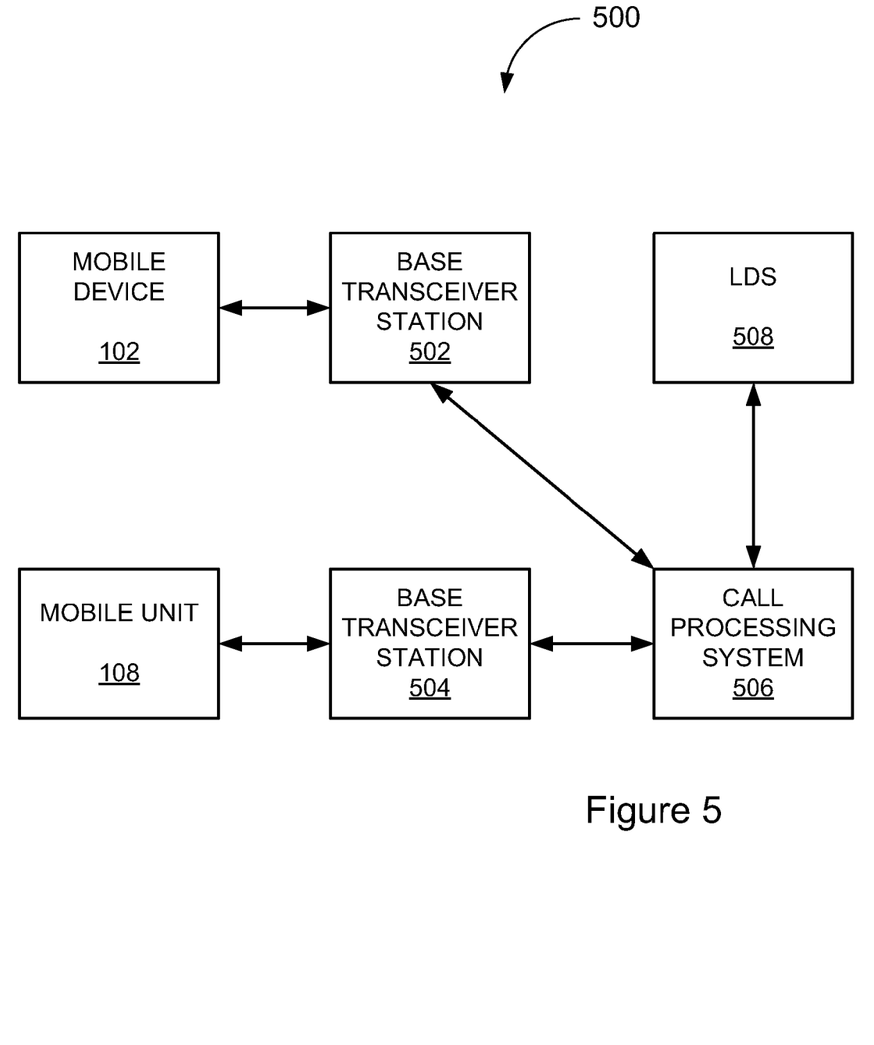
FIG. 5 is a block diagram illustrating a communication system for providing location services.

FIG. 5 is a block diagram illustrating a communication system 500 for providing location services. This communication system 500 is similar to the system illustrated in FIG. 1 and described above. Mobile device 102 communicates with call processing system (CPS) 506 through base transceiver station (BTS) 502. Mobile unit 108 communicates with CPS 506 through BTS 504. CPS 506 is coupled with location determination system 508. Other embodiments may include other devices and connections not illustrated in FIG. 5. For example, in some embodiments, BTS 501 may communicate with CPS 506 through a base station controller (BSC) and a gateway element such as a mobile switching center (MSC) and a telecommunication network such as the PSTN (Public Switched Telephone Network) or the Internet.

Figure 6:
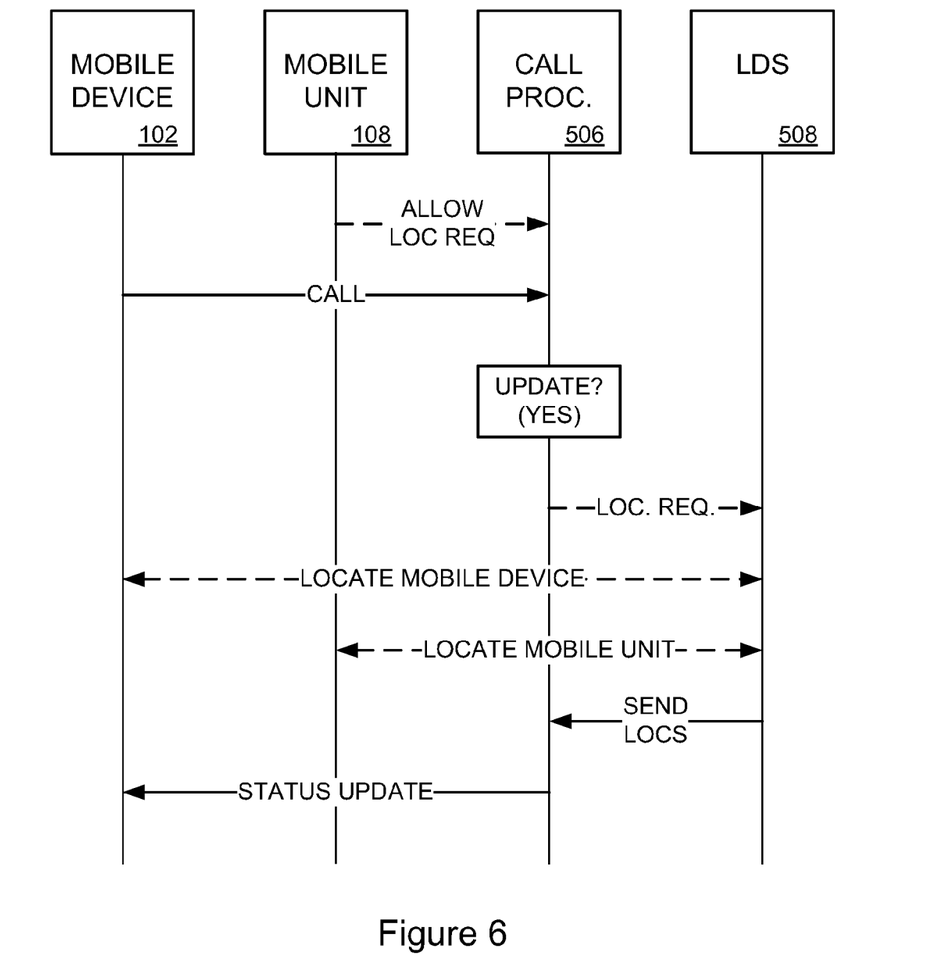
FIG. 6 is a call flow diagram illustrating a method for providing location services in the communication system of FIG. 5.

FIG. 6 is a call flow diagram illustrating a method for providing location services in the communication system 500 of FIG. 5. Similar to the call flow diagram of FIG. 4, in this example mobile unit 108 signals call processor 506 to allow location requests from mobile device 102. When call processor 506 receives a call from mobile device 102 it determines that mobile device 102 is qualified for a status update. Call processor 506 then sends a location request along with the identities of mobile unit 108 and mobile device 102 to location determination system 508. LDS 508 determines the locations of mobile device 102 and mobile unit 108 and sends these locations to call processor 506. Call processor 506 then provides a status update to mobile device 102.

Figure 7:
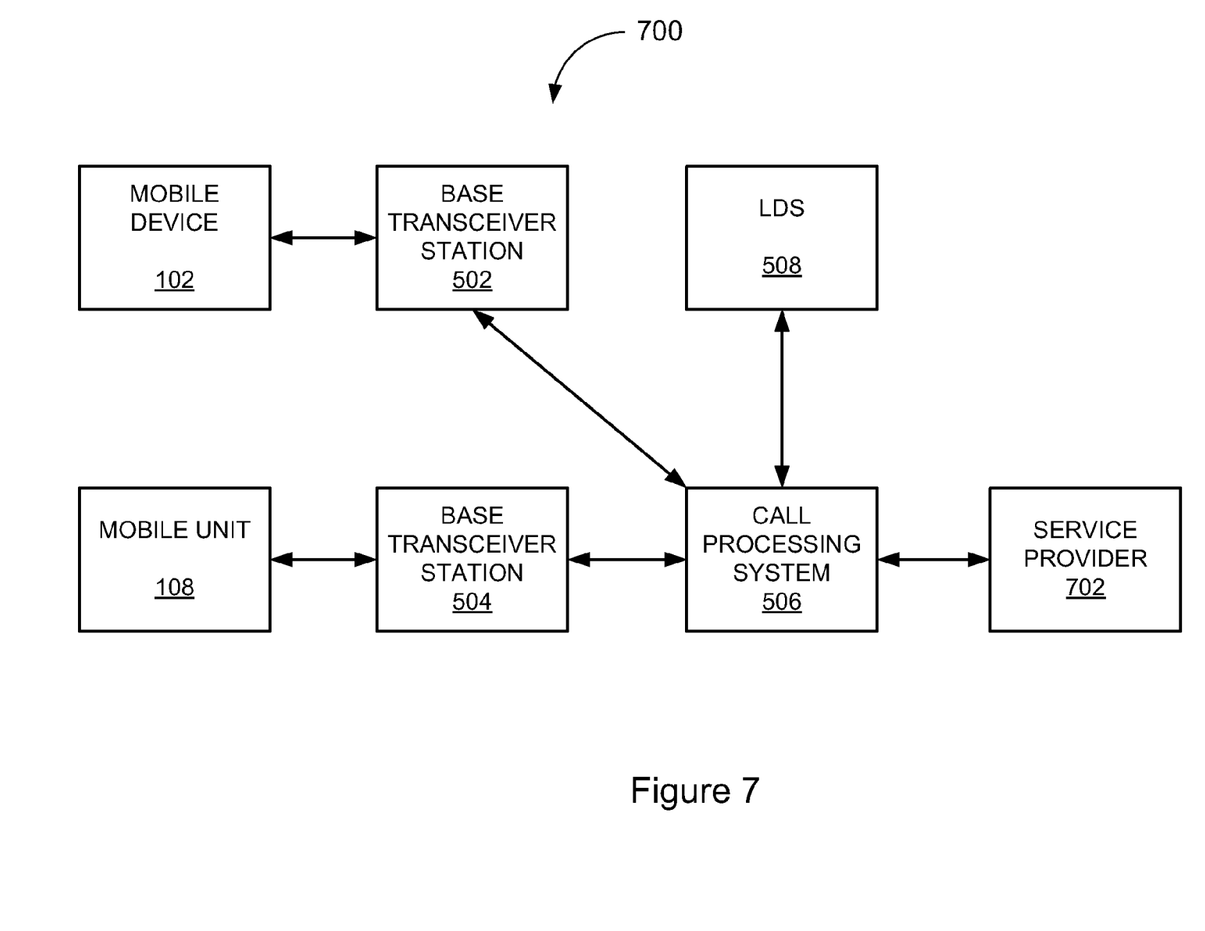
FIG. 7 is a block diagram illustrating a communication system for providing location services.

FIG. 7 is a block diagram illustrating a communication system 700 for providing location services. This communication system 700 is similar to that illustrated in FIG. 5, with the addition of a service provider 702. As in FIG. 5, mobile device 102 communicates with call processing system (CPS) 506 through base transceiver station (BTS) 502. Mobile unit 108 communicates with CPS 506 through BTS 504. CPS 506 is coupled with location determination system 508. Other embodiments may include other devices and connections not illustrated in FIG. 7. For example, in some embodiments, BTS 501 may communicate with CPS 506 through a base station controller (BSC). This base station controller may communicate with CPS 506 through a gateway element such as a mobile switching center (MSC) and then through a telecommunication network such as the PSTN (Public Switched Telephone Network) or the Internet, using any of a wide variety of communication protocols.

In this example call processor 506 also communicates with service provider 702. Service provider 702 may be a server within the entity that initiates the movement of mobile unit 108 to the location of mobile device 102. For example, service provider 702 may be the taxi company that dispatches a taxi (mobile unit 108) to the location of mobile device 102. In such an example service provider 702 may keep track of the correlation between mobile units and mobile devices. It may also process any location information and provide any status updates.

Figure 8:
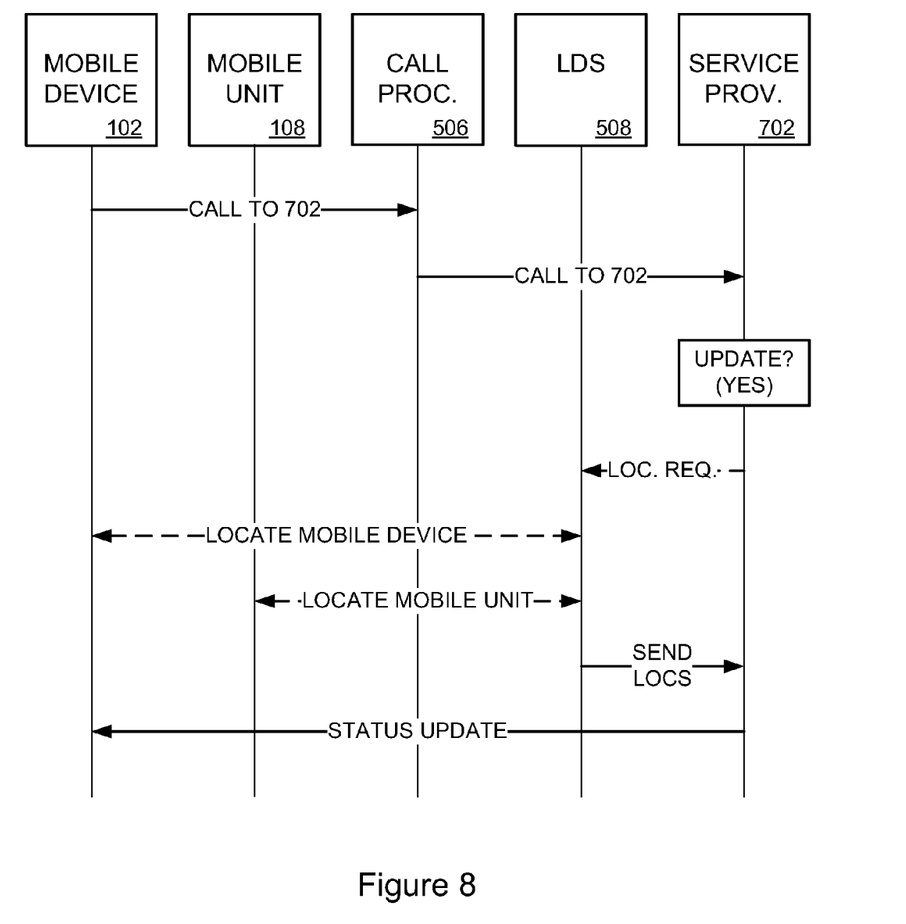
FIG. 8 is a call flow diagram illustrating a method for providing location services in the communication system of FIG. 7.

FIG. 8 is a call flow diagram illustrating a method for providing location services in the communication system 700 of FIG. 7. In this example, when mobile device 102 places a call to service provider 702, the call is routed through call processor 506. Service provider 702 then determines if mobile device 102 qualifies for a status update. If mobile device 102 qualifies for a status update, service provider 702 sends a location request to LDS 508. LDS 508 determines the locations of mobile device 102 and mobile unit 108 and sends these locations to service provider 702. Upon receipt of the locations, service provider 702, processes the locations and sends a status update to mobile device 102.

The methods, systems, networks, devices, service providers, call processors, centers, equipment, and servers described above may be implemented with, contain, or be executed by one or more computer systems. The methods described above may also be stored on a computer readable medium. Many of the elements of communication system 100 may be, comprise, or include computers systems. This includes, but is not limited to mobile device 102, mobile unit 108, communication network 110, communication system 104, location determination system 106, call processing system 506, and service provider 702. These computer systems are illustrated, by way of example, in FIG. 9.

Figure 9:
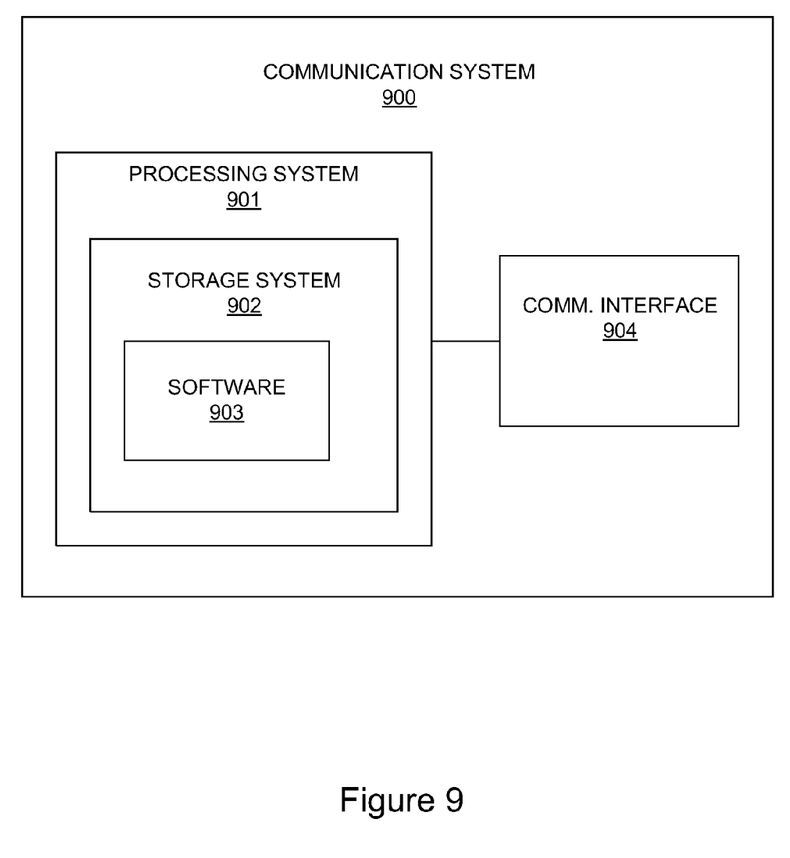
FIG. 9 is a block diagram of a communication system for providing location services.

Referring now to FIG. 9, communication system 900 includes communication interface 904 and processing system 901. Processing system 901 includes storage system 902. Storage system 902 stores software 903. Processing system 901 is linked to communication interface 904. Communication system 900 could be comprised of a programmed general-purpose computer, although those skilled in the art will appreciate that programmable or special purpose circuitry and equipment may be used. Computer system 900 may be distributed among multiple devices that together comprise elements 901-904.

Communication interface 904 could comprise a network interface, modem, port, transceiver, or some other communication device. Communication interface 904 may be distributed among multiple communication devices. Processing system 901 could comprise a computer microprocessor, logic circuit, or some other processing device. Processing system 901 may be distributed among multiple processing devices. Storage system 902 could comprise a disk, tape, integrated circuit, server, or some other memory device. Storage system 902 may be distributed among multiple memory devices.

Processing system 901 retrieves and executes software 903 from storage system 902. Software 903 may comprise an operating system, utilities, drivers, networking software, and other software typically loaded onto a computer system. Software 903 could comprise an application program, firmware, or some other form of machine-readable processing instructions. When executed by processing system 901, software 903 directs processing system 901 to operate as described herein for communication systems, such as mobile device 102, mobile unit 108, communication network 110, communication system 104, location determination system 106, call processing system 506, and service provider 702.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for providing location services comprising:
receiving a call request for a call from a mobile device, wherein the call request includes a caller identification;
determining if the call qualifies for a status update based on the caller identification;
in response to determining that the call qualifies for a status update, receiving a location of the mobile device;
determining the identity of a mobile unit that is in progress to the location of the mobile device, and initiating a location request of the mobile unit;
receiving a location of the mobile unit in response to the location request; and
providing status information based on the location of the mobile unit and the location of the mobile device to a user of the mobile device.

2. The method of claim 1, wherein the call qualifies for a status update if a previous call including the same caller identification has been received, and if the mobile unit is in progress to the location of the mobile device.

3. The method of claim 2, wherein determining the identity of the mobile unit is based on information indicating the mobile unit has been dispatched to the location of the mobile device.

4. The method of claim 1, wherein the call qualifies for a status update if the mobile unit is in progress to the location of the mobile device, and the mobile unit approves the status update.

5. The method of claim 1, wherein the status information is provided audibly to the user of the mobile device.

6. The method of claim 1, wherein the status information includes an estimated time of arrival.

7. The method of claim 1, wherein the status information includes the location of the mobile unit.

8. The method of claim 1, wherein the status information includes a distance between the mobile unit and the mobile device.

9. A communication system comprising:
a communication network;
a server coupled with the communication network; and
a location determination system coupled with the communication network, and configured to determine the location of mobile devices coupled with the communication network;
wherein the server is configured to:
receive a call request for a call from a mobile device, wherein the call request includes a caller identification;
determine if the call qualifies for a status update based on the caller identification;
in response to determining that the call qualifies for a status update, receive a location of the mobile device;
determine the identity of a mobile unit that is in progress to the location of the mobile device, and initiate a location request of the mobile unit;
receive a location of the mobile unit in response to the location request; and
provide status information based on the location of the mobile unit and the location of the mobile device to a user of the mobile device.

10. The communication system of claim 9, wherein the call qualifies for a status update if a previous call including the same caller identification has been received, and if the mobile unit is in progress to the location of the mobile device.

11. The communication system of claim 9, wherein the identity of the mobile unit is determined based on information indicating the mobile unit has been dispatched to the location of the mobile device.

12. The communication system of claim 9, wherein the call qualifies for a status update if the mobile unit is in progress to the location of the mobile device, and the mobile unit approves the status update.

13. The communication system of claim 9, wherein the status information is provided audibly to the user of the mobile device.

14. The communication system of claim 9, wherein the status information includes an estimated time of arrival.

15. The communication system of claim 9, wherein the status information includes the location of the mobile unit.

16. The communication system of claim 9, wherein the status information includes a distance between the mobile unit and the mobile device.

17. A non-transitory computer-readable medium having instructions stored thereon for operating a communication system to provide location services, wherein the instructions, when executed by the communication system, direct the communication system to:
    receive a call request for a call from a mobile device, wherein the call request includes a caller identification;
    determine if the call qualifies for a status update based on the caller identification;
    in response to determining that the call qualifies for a status update, receive a location of the mobile device;
    determine the identity of a mobile unit that is in progress to the location of the mobile device, and initiate a location request of the mobile unit;
    receive a location of the mobile unit in response to the location request; and
    provide status information based on the location of the mobile unit and the location of the mobile device to a user of the mobile device.

18. The computer-readable medium of claim 17, wherein the call qualifies for a status update if a previous call including the same caller identification has been received, and if the mobile unit is in progress to the location of the mobile device.

19. The computer-readable medium of claim 18, wherein the identity of the mobile unit is determined based on information indicating the mobile unit has been dispatched to the location of the mobile device.

20. The computer-readable medium of claim 17, wherein the call qualifies for a status update if the mobile unit is in progress to the location of the mobile device, and the mobile unit approves the status update.

21. The computer-readable medium of claim 17, wherein the status information is provided audibly to the user of the mobile device.

22. The computer-readable medium of claim 17, wherein the status information includes an estimated time of arrival.

23. The computer-readable medium of claim 17, wherein the status information includes the location of the mobile unit.

24. The computer-readable medium of claim 17, wherein the status information includes a distance between the mobile unit and the mobile device.

\* \* \* \* \*